US006694804B1

(12) United States Patent
Roelofs

(10) Patent No.: US 6,694,804 B1
(45) Date of Patent: Feb. 24, 2004

(54) METHOD AND DEVICE FOR EVALUATING AND/OR ADJUSTING THE CLEANING PERFORMANCE OF A CLEANING LIQUID

(75) Inventor: Robert R. Roelofs, Allen Park, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/252,281

(22) Filed: Sep. 23, 2002

(51) Int. Cl.[7] ......................... G01N 37/00; G01N 11/00

(52) U.S. Cl. ..................... 73/60.11; 73/53.01; 73/54.17

(58) Field of Search ............................ 73/60.11, 53.01, 73/54.02, 54.17, 60.1, 54.07

(56) References Cited

U.S. PATENT DOCUMENTS

| | | | | | |
|---|---|---|---|---|---|
| 3,935,130 | A | * | 1/1976 | Hirano et al. | 510/238 |
| 4,250,741 | A | * | 2/1981 | Scriven et al. | 73/64.48 |
| 4,651,000 | A | * | 3/1987 | Kravetz et al. | 250/303 |
| 4,933,056 | A | | 6/1990 | Corrigan et al. | 204/181.7 |
| 5,530,043 | A | | 6/1996 | Zawacky et al. | 524/317 |
| 5,760,107 | A | | 6/1998 | Valko et al. | 523/404 |
| 5,820,987 | A | | 10/1998 | Kaufman et al. | 428/413 |
| 5,908,822 | A | * | 6/1999 | Dishart | 510/467 |
| 6,083,755 | A | * | 7/2000 | Buess et al. | 436/55 |
| 6,251,849 | B1 | * | 6/2001 | Jeschke et al. | 510/470 |
| 6,300,296 | B1 | * | 10/2001 | Bergeron et al. | 510/127 |

OTHER PUBLICATIONS

"Physical Chemistry of Surfaces" (5th Edition) Arthur W. Adamson, John Wiley & Sons, Inc. 1990, pp. 20–23.*

"Process Control Using Dynamic Surface Tension Measurement" Victor P. Januel, SensaDyne Instrument Div., Clean-Tech 2001 Proceedings, pp. 151–162, 1991.

"Automatic Surface Tension Measurements of Aqueous Surfactant Solution by the Drop Volume Method" Hitoshi Matsuki and Shoji Kaneshina, pp. 4393–4396, 1994 American Chemcial Society.

"Surface Tension Measurements by an Automated Drop Volume Apparatus" T. Arnebrant and T. Nylander, pp. 209:213, Copyright 1985 by Marcel Dekker, Inc.

"A Surface Tension Apparatus According to the Drop Volume Principle" Eva Tornberg, pp. 50:53, Copyright 1977 by Academic Press, Inc.

"Hydrodynamic Effects in Measurements with the Drop Volume Technique at Small Drop Times 1. Surface Tensions of Pure Liquids and Mixtures" R. Miller, K. H. Schano, A. Hofmann pp. 189:196, Copyright 1994 Elsevier Science B.V.

"Dynamic Interfacial Properties in Emulsification" E.H. Lucassen–Reynders pp. 63:91.

"Surface Tension of Water and Benzene" William D. Harkins and F.E. Brown, pp. 499:524, 1918.

(List continued on next page.)

*Primary Examiner*—Hezron Williams
*Assistant Examiner*—Rodney Frank
(74) *Attorney, Agent, or Firm*—Deborah M. Altman

(57) ABSTRACT

A method and device are provided for measuring and/or adjusting the cleaning performance of a cleaning liquid. One method of the invention includes determining a control value (i.e., the number of drops of the cleaning liquid to provide a selected volume) indicative of when the cleaning performance of the cleaning liquid is at or approaching an unacceptable level. At least one substrate can be contacted with the cleaning liquid and a drop number for the cleaning liquid (i.e., the number of drops of the cleaning liquid to provide the selected volume) again measured. At least one cleaning agent, such as at least one surfactant, can be added to the cleaning liquid when the measured drop number is at or near the control value. In one embodiment, the cleaning agent can be added until the measured drop number is at or near a baseline drop number for the cleaning liquid (i.e., the number of drops of the cleaning liquid when cleaning performance is acceptable).

10 Claims, 3 Drawing Sheets

OTHER PUBLICATIONS

"A Growing Drop Technique for Measuring Dynamic Interfacial Tension" C.A. MacLeod and C.J. Radke pp. 435:448, copyright 1993 by Academic Press, Inc.

"Real–Time Contamination Detection Dynamic Surface Tension Measurement offers Real–Time Contamination Detection in Critical Cleaning Processes" Victor Janule, pp. 23, 25, 27, Copyright Mar. 2000 for PC.

"Aqueous Cleaning Technology: How Long is a Cleaning Bath Really Effictive?" Dr. Steven A. Bolkan, Lisa Kurschner, Eric Eichhorn, Copyright Oct. 1996 PC.

"Experimental Effects Help Predict Cleaning Success" B.A. Starkweather, B.L. Connell, and R.M. Counce, pp. 31:37, Copyright Jul. 1998PC.

"An Automatic Titration System for Dynamic Surface Tension and CMC Measurements" Victor P. Janule, pp. 10:15, Copyright 1996 MCB University Press.

"Automatic Determination of Dynamic CMCs Three–Dimensional Characterization of Surfactants/Additives" T.C. Christensen, V.P. Janule, A.F. Teichmann, pp. 1:12, Sensa-Dyne Instrument Division, Chem–Dyne Research Corp.

"Measurement of Dynamic Surface Tension of Surfactant Solutions with the Drop Volume Method Using an Automatic Drop Detector" K. Kozco and J.M. Soos, pp. 269:274, Technical University of Budapest 1988.

"Will This Work?" Kathleen W. Ng and John L. Brand, Ph.D pp. 25:29, Copyright Sep. PC 1999.

"Notes Alternative Methods for the Determination of Surface Tension Using Drop–Weight Data" pp. 551:554, Journal of Colloid and Interface Science vol. 115, No. 2, Feb. 1987.

"Effect of Interfacial Tension and Droplet Size on Coagulation, Adhesion and Rheology of Concentrated Emulsions" Valery G. Babak, pp. 279:294, Colloids and Surfaces A: Physicochemical and Engineering Aspects, 85(1994).

* cited by examiner

METHOD AND DEVICE FOR EVALUATING AND/OR ADJUSTING THE CLEANING PERFORMANCE OF A CLEANING LIQUID

BACKGROUND OF THE INVENTION

1. Field of the Invention

This invention relates generally to the field of liquid cleaning baths and, in one particular embodiment, to a method and device for evaluating and/or adjusting the cleaning performance of an aqueous cleaning liquid in a cleaning bath of a production process, such as an automotive production process.

2. Technical Considerations

In many production processes, parts are fabricated, cleaned, coated, and assembled into a final product. For example, in the appliance field, metal frames for appliances, such as refrigerators, stoves, washers, dryers, and the like, are shaped and painted before final assembly. As a further example, in a conventional automotive production process, the individual parts and components used to make up a vehicle are initially machined, welded, or fabricated at a body shop. In the course of this process, protective oils and lubricating oils are applied to the parts to aid in cutting and forming the parts and also to prevent corrosion. The "part" could be an assembled auto body, conventionally referred to as a "body in white", or could be one or more smaller parts or pieces. From the body shop, the parts are transferred to a paint shop for the application of various coatings, such as anticorrosion coatings and color coatings. However, prior to coating, the parts must be thoroughly cleaned and degreased to remove the oils and grime accumulated in the body shop to ensure that the applied coatings will cover and adhere to the parts evenly. This cleaning operation can involve one or more spray cleaning steps and one or more immersion cleaning steps in which the parts are respectively sprayed with or immersed in a cleaning liquid. The cleaning liquid is typically an aqueous surfactant solution. After the parts are cleaned and coated at the paint shop, they are transferred to an assembly shop to be assembled into the vehicle. Because it is cost intensive to operate a production line, it is desirable that the line not be stopped during scheduled production time. Every effort is made to ensure that process tank chemicals perform adequately until they can be conveniently changed on scheduled maintenance days.

In the course of this conventional production process, the cleaning performance of the cleaning liquid will eventually decrease due to such factors as oil loading and bath drag out. By "oil loading" is meant the build-up of oil and dirt in the cleaning liquid from the parts being cleaned. The cleaning bath can become saturated with oil and dirt to the point where only marginal levels of cleaning agent, e.g., surfactant, are available for cleaning. By "bath drag out" is meant the loss of cleaning liquid (both solvent and surfactant) carried out of the bath by adherence to the cleaned parts. If no action is taken, the cleaning performance of the cleaning liquid will eventually degrade to the point where the parts are not adequately cleaned of oils and grime prior to application of the coatings. In which case, the coatings may not adhere to oily or dirty portions of the part or may be unevenly distributed on the part due to the presence of oil and/or dirt. Such poorly coated parts oftentimes must be either discarded or sanded down and re-coated, which can increase production time as well as cost.

In order to avoid this problem, the cleaning liquid may be preemptively disposed of, or additional cleaning liquid may be added to the bath to recover cleanability, or the bath may be operated at a higher cleaning agent concentration than normally needed out of fear of losing cleaning performance. Most conventional automotive production facilities simply dump the cleaning liquid and replace it with fresh cleaning liquid after a set period of time before the cleaning liquid can degrade to the point when the cleaning performance becomes unacceptable. The time period to dump and replace the cleaning liquid is typically determined by prior cleaning experience or by comparison with the cleaning baths of other production facilities. For example, if prior experience has taught that the cleaning performance of a particular cleaning liquid at one production facility typically degrades to unacceptable levels after about two and a half weeks, the cleaning liquid may be dumped after only about two weeks just to avoid the possibility of inadequately cleaned parts. While this procedure does decrease the occurrence of poorly cleaned and, hence, poorly coated parts, it can also lead to the premature dumping of cleaning liquid which could still be perfectly adequate for cleaning, i.e. which still has acceptable cleaning performance. Also, just because a cleaning liquid may degrade to unacceptable levels at one facility in a particular period of time does not necessarily mean that the same or different cleaning liquid will degrade in the same time period at another facility. This premature dumping of cleaning liquid can increase production costs since usable cleaning liquid could be, and oftentimes is, prematurely dumped and replaced with fresh cleaning liquid.

Rather than simply dumping the cleaning liquid after a given time period or operating at excessive cleaning agent concentrations, it would be advantageous if the cleaning liquid could be easily and economically tested on-line to determine whether the cleaning performance was still adequate or whether the cleaning performance was approaching the point of unacceptability. While the amount of oil in the cleaning liquid could be analytically measured, such a procedure would be prohibitively time consuming and complicated for most conventional industrial applications. Conventional surface tension measurements, such as capillary rise, du Nouy ring, and Wilhelmy plate methods, measure static surface tension and are not easily adapted to measure dynamic changes to the surface tension of an on-line cleaning liquid. Also, these conventional methods may be appreciably influenced by the state of wetting and the contact angles between the solution and the ring or glass surface.

One commonly used method of estimating the cleaning performance of a conventional cleaning liquid is by measuring the alkalinity of the cleaning liquid. In many conventional cleaning systems, the cleaning liquid includes not only surfactants but also alkaline builders. By "builders" is meant the inorganic salts used to soften the water and/or change the structure of the water to enhance surfactant performance. Examples of such builders include alkali metal salts of silicates, carbonates, and phosphates. It is assumed that the surfactants are consumed at about the same rate as the alkaline builders and, hence, the surfactant level is estimated from the amount of alkaline builders remaining in the bath. However, while the surfactant concentration can be loosely correlated to the alkalinity of the coating liquid, this is in reality simply an indirect measurement and may not be particularly accurate for any one particular cleaning liquid. Additionally, while this estimation process can be utilized for conventional alkaline cleaning liquids, it cannot be used for cleaning baths incorporating bioremediation. As will be appreciated by one skilled in the art, "bioremediation" refers to the presence of oil-consuming bacteria in the cleaning liquid to break down oils in the cleaning bath. In bioremediation systems, conventional alkaline builders are typically not used or not used in any great quantity since such alkaline builders tend to kill the bacteria.

Therefore, it would be advantageous to provide a method and/or device that could be easily and economically utilized to predict or measure the cleaning performance, e.g., cleaning agent or surfactant level or concentration, of a cleaning liquid, such as in an automotive production process. It would further be advantageous to provide a method and device for adjusting the cleaning performance of a cleaning liquid when the measured cleaning performance is at or below a desired level.

SUMMARY OF THE INVENTION

A method is provided for measuring and/or adjusting the performance, such as the cleaning performance, of a liquid, such as a cleaning liquid. Suitable cleaning liquids for the practice of the invention include, but are not limited to, conventional bioremediation and non-bioremediation cleaning liquids used in automotive production processes. One exemplary method of the invention includes determining a control value indicative of when the cleaning performance of the cleaning liquid is at or approaching an unacceptable level. The control value can be the number of drops of the cleaning liquid to provide a selected volume or selected weight of the cleaning liquid. At least one substrate can be contacted with, e.g., cleaned with, the cleaning liquid and a drop number for the cleaning liquid (i.e., the number of drops of the cleaning liquid to provide the selected volume or selected weight) measured after contact with the substrate. This procedure can be repeated and at least one cleaning agent, such as at least one surfactant, can be added to the cleaning liquid when the measured drop number is at or near the control value. In one embodiment, the cleaning agent can be added until the measured drop number is at or near a baseline drop number for the cleaning liquid (i.e., the number of drops of the cleaning liquid to provide the selected volume or selected weight when cleaning performance is acceptable).

An apparatus for cleaning substrates in accordance with the invention comprises an evaluation device that can be in flow communication with a source of cleaning liquid to be evaluated. In one non-limiting embodiment, the evaluation device includes a drop device and, optionally, a device for counting the number of drops of cleaning liquid discharged from the drop device to provide a selected volume of the liquid. The apparatus can also include an addition device to add one or more cleaning agents, e.g., one or more surfactants, to the cleaning tank based on a signal from the evaluation device. In another embodiment, the evaluation device can comprise a drop device and an optional device for counting the number of drops discharged from the drop device to provide a selected weight of the liquid.

DESCRIPTION OF THE PREFERRED EMBODIMENTS

Figure 1:
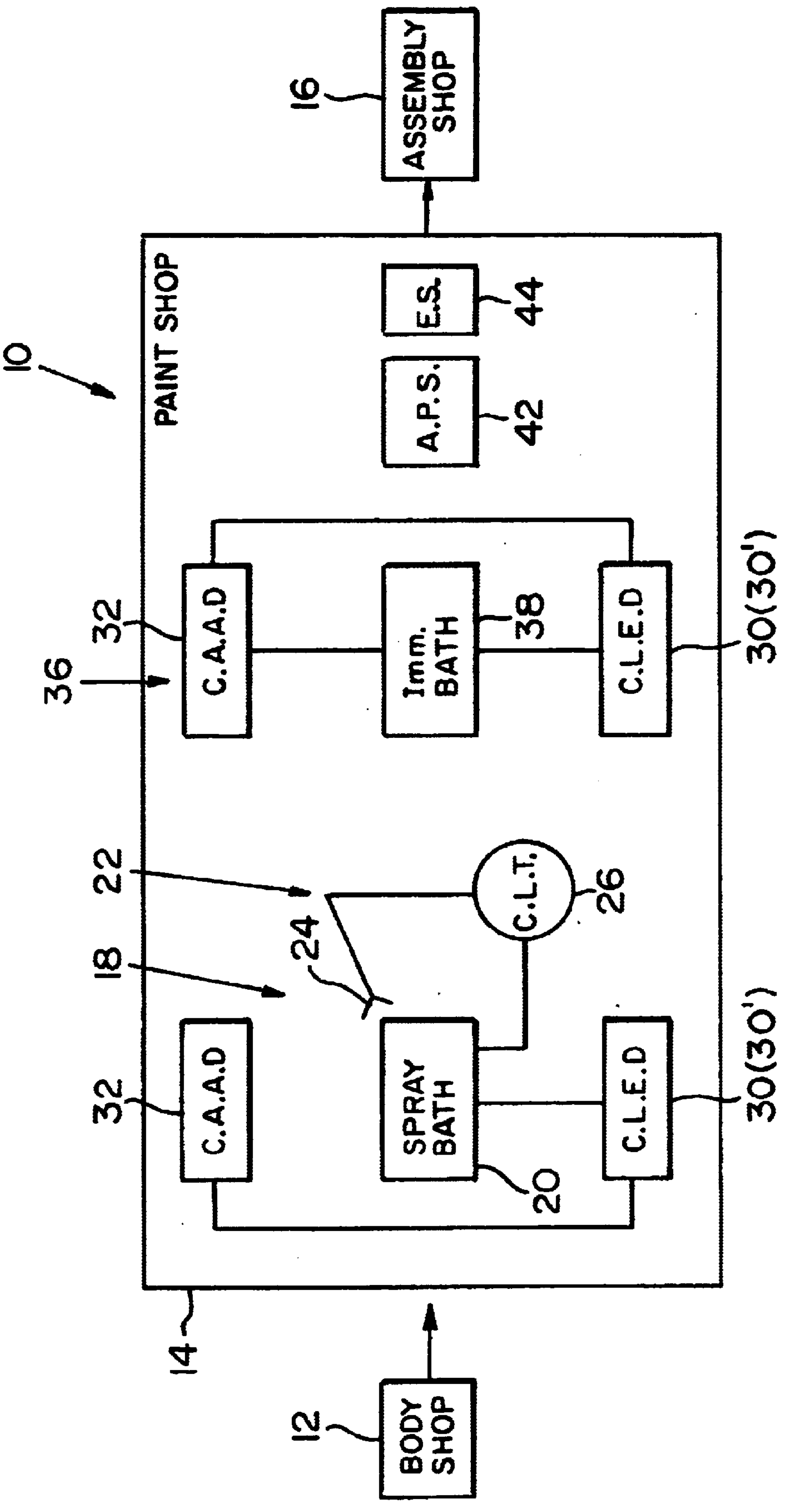
FIG. 1 is a block diagram (not to scale) of an automotive production line incorporating features of the invention.

As used herein, spatial or directional terms, such as "up", "down", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, any reference indicated to as being "incorporated herein" is to be understood as being incorporated in its entirety. Any reference to amounts, unless otherwise specified, is "by weight percent". The term "drop number" means the number of drops of a liquid to provide a selected volume or selected weight of the liquid. The term "baseline drop number" means the drop number of a non-contaminated liquid. The term "critical point" means the drop number of a liquid at which the liquid begins to exhibit unacceptable properties for a particular application.

An exemplary practice of the invention will now be described with particular reference to use in an aqueous cleaning bath of an automotive production process. However, it is to be understood that this is simply one area in which the invention could be practiced and the invention is not limited to use with aqueous cleaning liquids or limited to use in the automotive production field. In its broad aspects, the invention could be practiced with any liquid (whether aqueous or non-aqueous) where surface tension changes over time. The specific systems described below are presented simply to illustrate the basic concepts of the invention and the invention is not limited to the specifically disclosed embodiments.

An automotive production process having a production line 10 incorporating features of the invention is schematically shown in FIG. 1. Exemplary components of the production line 10 will first be described and than exemplary methods and devices for incorporating the concepts of the invention into the production line 10 will be described. It should be appreciated that the production line 10 is not limited to the specific components described but may include any conventional components customarily used in an automotive production process.

The production line 10 includes a body shop 12, a paint shop 14, and an assembly shop 16. As will be appreciated, the "shops" can be at separate physical locations from one another or can simply be separate areas of the production line 10. The paint shop 14 can include several cleaning and coating devices. In the illustrated exemplary embodiment, the paint shop 14 includes at least one spray cleaning station 18 having a spray bath 20 with a spray device 22. The spray device 22 can include a spray nozzle 24 in flow communication with a tank or reservoir containing cleaning liquid, such as a cleaning liquid tank 26.

As will be described in more detail below, a cleaning liquid evaluation device 30 (or 30') can be in flow communication with the spray bath 20 and/or the tank 26. As will also be described in more detail below, a cleaning agent addition device 32 can be operationally connected to the evaluation device 30 (or 30') and can also be in flow communication with the spray bath 20 and/or the tank 26.

At least one immersion cleaning station 36 can be located downstream of the spray cleaning station 18. The immersion cleaning station 36 can include an immersion bath 38 and a conveyor device (not shown) to immerse parts into the immersion bath 38. Another evaluation device 30 (or 30') can be in flow communication with the immersion bath 38 and another addition device 32 can be operationally connected to the evaluation device 30 (or 30') and can be in flow communication with the immersion bath 38.

One or more coating stations can be located downstream of the immersion cleaning station 36. For example, a conventional anticorrosion pretreatment station 42 can be positioned downstream of the immersion bath 38 and a conventional electrocoating station 44 can be located downstream of the pretreatment station 48. As will be appreciated by one skilled in the art, it is to be understood that other rinse and/or coating stations could be located in the paint shop 14. For example, additional rinse conditioner stations, titanium activator application stations, sealing stations, and one or more other rinse baths could be located in the paint shop 14.

Figure 2:
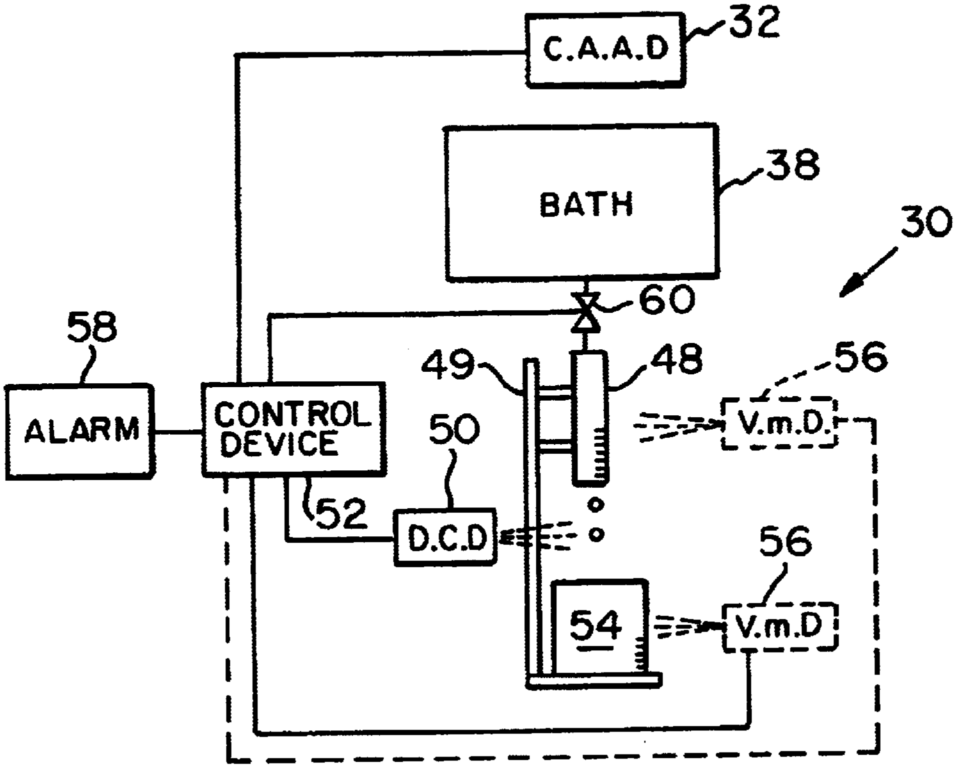
FIG. 2 is a block diagram (not to scale) of a device for evaluating and/or adjusting the cleaning performance of a cleaning liquid in accordance with one embodiment of the invention.

An exemplary evaluation device 30 incorporating features of the invention is schematically shown in FIG. 2. The illustrated evaluation device 30 is a drop-per-volume measurement device, i.e., a device to measure the number of drops of a liquid to provide a selected volume. The evaluation device 30 includes a drop discharge device 48 which can be in flow communication with a source of cleaning liquid to be evaluated. This "flow communication" could be via a conduit or could be via manual addition of cleaning liquid to the device 48 by an operator. In the illustrated embodiment, the drop discharge device 48 is shown in flow communication with the immersion bath 38 by conduit having a sample valve 60. In the broad practice of the invention, the discharge device 48 could be in flow communication with any source of liquid to be evaluated.

The drop discharge device 48 can be any device configured to discharge drops of the cleaning liquid, e.g., under the influence of gravity. In one embodiment, the drop discharge device 48 can be a conventional laboratory burette mounted on a stand 49. An optional drop-counting device 50 can be positioned adjacent to the drop discharge device 48 and can be configured to count the number of drops of the cleaning liquid discharged from the drop discharge device 48. The counting device 50 can be of any conventional type, such as but not limited to an electromagnetic sensor or electromagnetic beam device. One example of a suitable counting device is a Model LC4H electronic counter, commercially available from NAIS, coupled with an OPTO Sensor, commercially available from OMRON Electronics. The counting device 50 can be electronically connected to a control device 52, such as a conventional computer control device. A container 54, such as but not limited to a volumetric flask, a graduated cylinder, or a marked graduated container or similar container, can be located adjacent the drop discharge device 48 to receive the drops of cleaning liquid discharged from the drop discharge device 48. In one embodiment, an optional volume measurement device 56, such as a conventional electronic or mechanical volume measurement device, can be connected to or located adjacent the container 54. The volume measurement device 56 can also be electronically connected to the control device 52. In an alternative embodiment and as illustrated in dashed lines in FIG. 2, a volume measurement device 56 could also be or could alternatively be positioned adjacent to or connected to the drop discharge device 48 to measure the change in volume of cleaning liquid in the drop discharge device 48 as drops of cleaning liquid are discharged therefrom and are counted by the drop-counting device 50. An alarm 58, such as an audio or visual alarm, can be connected to the control device 52 and can be activated when a measured drop number for the cleaning liquid reaches a predetermined control value, as described in more detail below.

In another embodiment, the drop-counting device 50 can be eliminated and the number of drops discharged from the device 48 visually counted by a worker or operator positioned at or near the evaluation device 30.

As also shown in FIG. 2, the addition device 32 can be operationally connected to the control device 52 and can be positioned such that upon activation by the control device 52 the addition device 32 can add a predetermined amount of cleaning agent and/or liquid, such as one or more surfactants and/or additional liquid (solvent), to the cleaning bath. In the illustrated embodiment, the addition device 32 is positioned above the immersion bath 38. In one embodiment, the addition device 32 can include one or more tanks or containers containing one or more cleaning agents or mixtures of cleaning agents. The cleaning agent can also include builders if used in a non-bioremediation system.

Figure 3:
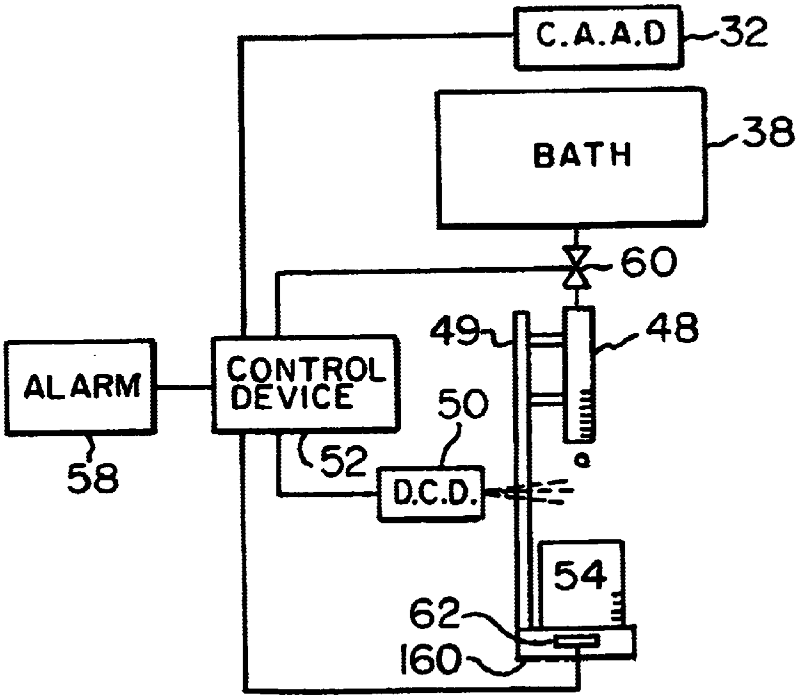
FIG. 3 is a block diagram (not to scale) of a device for evaluating and/or adjusting the cleaning performance of a cleaning liquid in accordance with another embodiment of the invention.
Figure 4:
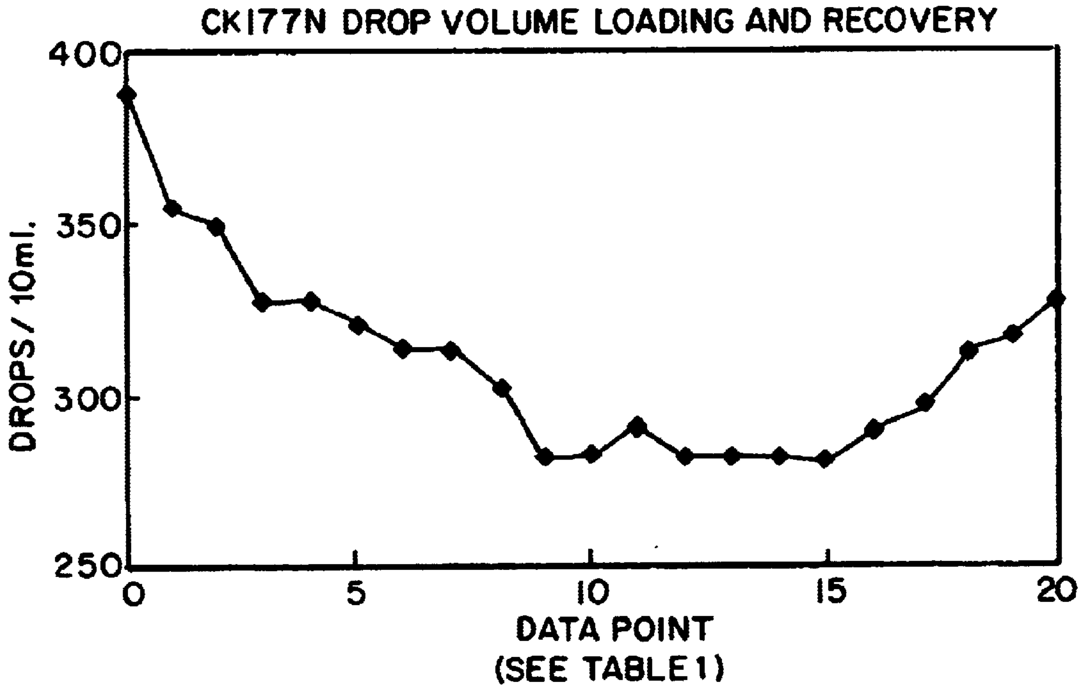
FIG. 4 is a graph of the number of drops of a cleaning liquid to provide a volume of 10 ml versus the amount of oil and cleaning agent in the cleaning liquid.

Another evaluation device 30' is shown in FIG. 3. The evaluation device 30' is similar to the device 30 but rather than being a drops per volume device, the device 30' is a drops per weight device. The device 30' also includes a drop discharge device 48 to discharge drops of the cleaning liquid into a container 54. However, in this embodiment, the container 54 is operationally connected to (e.g., is resting on) a weight measurement device 160 to monitor and/or determine the weight of the cleaning liquid in the container 54. The weight measurement device 160 can be any conventional device, such as but not limited to a conventional electronic scale or a conventional spring or lever type balance. The weight measurement device 160 can include a display 62 to display the weight of cleaning liquid in the container 54. Additionally or alternatively, the weight measurement device 160 can be electronically connected to the control device 52.

Operation of the production line 10 incorporating the evaluation device 30 and addition device 32 will now be described.

As will be appreciated by one skilled in the art, automotive parts are cut, welded, fabricated, adhered, and/or processed in other ways customary in the art at the body shop 12. During this processing, protective oils and lubricating oils are typically applied onto the automotive parts to aid in cutting, forming and processing the parts and also to help prevent corrosion. Additionally, the parts may also still have mill oils adhered thereto. As will be appreciated by one skilled in the art, mill oils are applied at the mill where metal substrates are rolled into a coiled metal stock. The mill oils help prevent corrosion during coiling and shipping.

The parts are transferred from the body shop 12 to the paint shop 14 to be cleaned and coated. In the illustrated embodiment, the parts are transferred to the spray cleaning station 18 where cleaning liquid from the tank 26 can be pumped to the nozzle 24 and sprayed onto the parts to remove at least some of the oils and dirt from the parts before further processing. The applied cleaning liquid and the removed oils and dirt fall into the spray bath 20 and this liquid can be recirculated to the tank 26 for further use. Any conventional cleaning liquid can be utilized in the practice of the invention. Examples of conventional cleaning liquids include, but are not limited to, the CHEMKLEEN® family of cleaning liquids commercially available from PPG Industries, Inc. of Pittsburgh, Pa. Such conventional cleaning liquids typically include one or more surfactants dissolved in an aqueous solvent. The cleaning liquid can also include alkaline builders as described above. However, for cleaning liquids incorporating bioremediation, such builders are typically absent or are present at very low levels.

After this spray treatment at the spray station 18, the parts can be conveyed to the immersion cleaning station 36 and immersed in the immersion bath 38. The immersion bath 38 also includes a conventional cleaning liquid, such as those described above. At least some of the residual oils and grime not removed at the spray cleaning station 18 can be removed at the immersion cleaning station 36. The parts from the immersion station 36 can then be further treated and/or coated in conventional manner. For example, the parts can be conveyed to the anticorrosion station 42 where an anticorrosion pretreatment material can be applied onto the cleaned part. Examples of such anticorrosion pretreatment coatings include, but are not limited to, CHEMFOS 700® Zinc Phosphate Pretreatment or BONAZINC® Zinc-Rich Pretreatment (each commercially available from PPG Industries, Inc. of Pittsburgh, Pa.). These pretreatment coatings enhance the corrosion resistance of the part. As will be appreciated by one skilled in the art, should the parts not be adequately cleaned prior to application of the pretreatment coating, portions of the part could be uncoated. Alternatively, the relative thickness of the pretreatment coating over dirty or oily spots of the part could be less than that over the clean portion of the part and, hence, could lead to areas of increased corrosion susceptibility on the part.

From the anticorrosion station 42, the parts can be transferred to one or more coating stations, such as the electrocoating station 44 for application of one or more pigmented coatings, such as basecoats or topcoats. Useful electrodeposition methods and electrodepositable coating compositions include conventional anionic or cationic electrodepositable coating compositions, such as epoxy or polyurethane-based coatings. Examples of some suitable electrodepositable coatings are disclosed in U.S. Pat. Nos. 4,933,056; 5,530,043; 5,760,107; and 5,820,987, which are herein incorporated by reference. As will be appreciated by one skilled in the art, any portions of the part not coated or poorly coated at the anticorrosion station 42 due to the presence of oil or grime can cause non-uniform application of subsequent coatings, such as the electrocoating composition at the electrocoating station 44. Patterning or non-uniform thickness of the pretreatment coating can telegraph through subsequently applied coatings, e.g., topcoats, resulting in visually perceptible patterning or color variations commonly referred to as "mapping".

The coated part from the paint shop 14 can then be transferred to the assembly shop 16 for final assembly into the vehicle.

As can be appreciated, as this process continues, the oil and grime rinsed off of the parts at the spray station 18 and immersion station 36 are deposited in the cleaning liquid at the respective stations. Since this cleaning liquid is typically recycled during use, the accumulation of oil and grime can affect the cleaning performance of the cleaning liquid. In the past, the cleaning liquid would simply be dumped and replaced after a set time period. However, in the practice of the invention, rather than simply dumping the cleaning liquid after a set period of time, the evaluation device 30 (or device 30' described below) can be utilized to evaluate the cleaning performance of the cleaning liquid. The cleaning liquid can be replaced or additional liquid and/or cleaning agent, such as one or more surfactants and/or one or more builders, can be added to the cleaning liquid when the cleaning performance degrades to a predetermined level.

In the practice of the invention, the cleaning performance of a cleaning liquid can be initially evaluated prior to use in the cleaning process. This initial evaluation can be done in a laboratory by obtaining a clean (i.e., non-contaminated) sample of the cleaning liquid to be utilized in a cleaning bath in the paint shop 14 and evaluating the non-contaminated cleaning liquid in accordance with the invention. In one embodiment, this initial evaluation can be performed by measuring the number of drops of a sample of the cleaning liquid required to provide a predetermined or selected volume of the cleaning liquid. As will be appreciated, the lower the surface tension of the cleaning liquid, the smaller the average drop size will be and the larger the number of drops required to provide the selected volume of the liquid. After this initial or "baseline" drop number of the non-contaminated cleaning liquid sample is determined, a known volume of one or more contaminants, such as one or more oils, can be added to the cleaning liquid and the drop number (i.e., the number of drops of the cleaning liquid to provide the selected volume) again measured. The oil or oils used in this initial evaluation process can be those expected to be used at the body shop 12 for the process.

After the contaminant (e.g., one or more oils) is added to the cleaning liquid sample, a substrate, such as a metal substrate, can be contacted with the contaminated cleaning liquid sample and the cleaning performance of the cleaning liquid evaluated in any conventional manner utilized in the relevant process. For example, in the automotive industry, a standard way of evaluating the cleaning performance of a cleaning liquid is the conventional "water break free" test. No water break indicates a clean surface, i.e., a surface with no or very little residual oil. By "no water break" is meant that water forms a complete film over the metal surface without any breaks, beading, or gaps. Water break is typically reported as a percentage with 100% meaning the cleaned substrate is water break free. For most automotive applications, any water break percentage less than about 99% is unacceptable. However, as will be appreciated, for other non-automotive applications lower water break percentages could still be acceptable.

After the initial oil addition and performance evaluation is made, additional fixed amounts of the contaminant(s) can be added to the cleaning liquid sample and the drop number and cleaning performance of the cleaning liquid again evaluated in similar manner as described above after each oil addition step. As the surface tension of the cleaning liquid sample increases due to the addition of oil or contaminants to the system, the number of drops to provide the selected volume will decrease since the drop size will increase with increased surface tension. Eventually, enough oil or contaminants will be added to the cleaning liquid sample such that the performance evaluation of the cleaning liquid will be unacceptable, e.g., the water break percentage will be lower than a desired level for a particular application. The drop number (i.e., number of drops of cleaning liquid to provide the selected volume) associated with the cleaning liquid at the point where the liquid performance becomes unacceptable can be designated as a "critical point" for the cleaning liquid. Thus, as this critical point is approached, action should be taken to prevent inadequate cleaning of the parts. For example, a "control value" can be defined for the cleaning liquid. The control value can be a drop number of the cleaning liquid above the critical point and defining a point at which action should be taken to prevent the cleaning liquid from reaching the critical point, i.e. a point where action should be taken to prevent the cleaning performance from degrading to an unacceptable level. In one non-limiting example, the control value can be defined to provide an operator sufficient time to treat or replace the cleaning liquid before the critical point is reached. In another embodiment, the control value can be defined as the critical point plus 25%. Thus, if the critical point is 100 drops, the control value would be 125 drops. Alternatively, the control value can be defined as the critical point plus 20%, such as 15%, such as 10%, such as 5%. In another embodiment, the control value can be arbitrarily selected. For example, when the control value is reached, the contaminated cleaning liquid could be dumped and replaced with fresh cleaning liquid. Alternatively, when the control value is reached, additional cleaning agents, such as one or more surfactants, can be added to the cleaning liquid. In the initial evaluation process under discussion, fixed amounts of cleaning agent can be added to the contaminated cleaning liquid sample and the drop number and cleaning performance of the cleaning liquid again evaluated in similar manner as described above until the cleaning performance of the cleaning liquid again reaches a level of acceptability for a particular application. For automotive applications for example, the cleaning agent can be added until the cleaning liquid again results in greater than or equal to 95% water break free, such as greater than or equal to 98% water break free, such as greater than or equal to 99% water break free, such as 100% water break free. In another example, sufficient cleaning agent can be added until the measured drop number returns to about the baseline drop number. By "about the baseline drop number" is meant the baseline drop number ±25%, such as ±15%, such as ±10%, such as ±5%. Thus, if the baseline drop number is 100, the baseline drop number ±25% would be 100±25. The amount of cleaning agent added to restore the cleaning performance of a particular amount of the cleaning liquid to an acceptable level can be designated as a "control amount" of the cleaning agent, e.g., X grams of cleaning agent per Y liters of cleaning liquid. As will be appreciated, the control amount of the cleaning agent can vary depending upon the type of cleaning liquid used. In a hypothetical example illustrating the above concept, if the baseline drop number for a particular cleaning liquid is 350, oil can be added in the stepwise manner described above and the cleaning performance evaluated until the cleaning performance becomes unacceptable, for example at a drop number of 275 (the critical point). Thus, for this cleaning liquid, it would be established that when the drop number approaches 275, either the cleaning liquid should be changed or additional cleaning agent should be added to the cleaning liquid to maintain the drop number above the critical point. In one embodiment, the cleaning agent can be added in an amount sufficient to return the drop number to about the baseline value, e.g., until the drop number again increases to about 350. For example, a control value could be defined (e.g., by experimentation or arbitrarily) above 275 as a point to take action. In this hypothetical example, the control value could be set at a value of 285. Since many automotive production cleaning baths utilize commercially available cleaning liquids, once the critical point, the control value, and the control amount are determined for a particular cleaning liquid used for a particular purpose, the on-line performance of the cleaning liquid can be quickly and easily evaluated by measuring the drop number (e.g., the number of drops to provide the selected volume) of the cleaning liquid and comparing the measured drop number to the control value.

In the exemplary embodiment under discussion and shown in FIG. 2, it is to be assumed that this initial evaluation of the cleaning liquid has already been done. Thus, as parts are cleaned at the immersion station 36, the sample valve 60 can be opened to allow cleaning liquid from the bath 38 to flow into the drop device 48. Alternatively, the drop device 48 need not be directly connected to the bath 38. An operator can remove a sample of the cleaning liquid from the bath 38 and manually place it, e.g., pour it, into the drop device 48. Drops of the cleaning liquid are discharged from the drop device 48 and into the container 54. The optional drop-counting device 50 can count the number of drops discharged from the drop device 48 and the optional volume measurement device 56 can measure the volume of cleaning liquid deposited in the container 54. Thus, the drop-counting device 50 and the volume measurement device 56 can be used to determine the number of drops of the cleaning liquid required to provide a predetermined or selected volume of the cleaning liquid (e.g., number of drops per 10 milliliters). The control device 52 can open and close the sample valve 60 at predetermined intervals such that the drop number of the cleaning liquid can be periodically evaluated during operation of the production line. When the cleaning liquid drop number reaches or approaches the preselected control value for the cleaning liquid, the control device 52 can activate the alarm 58 to provide an audio and/or visual alarm that the cleaning performance (e.g., the surfactant level) in the cleaning liquid has reached or is approaching an unacceptable level. At this point, the cleaning liquid can be discarded and fresh cleaning liquid added to the immersion bath 38. Alternatively, in one embodiment of the invention, rather than discarding the cleaning liquid, additional cleaning agent and/or solvent can be added to the immersion bath 38. For example, when the alarm 58 is activated, personnel at the production line can manually add additional cleaning agent to the immersion bath 38. For example, the predetermined control amount of the cleaning agent can be added to the immersion bath 38. However, in another embodiment of the invention, when the control value of the cleaning liquid is reached, the control device 52 can activate the addition device 32 to automatically add additional cleaning agent to the immersion bath 38. For example, the addition device 32 can be configured to add the control amount of the cleaning agent to the immersion bath 38 when activated by the control device 52.

In another embodiment, the drop-counting device 50 and/or the volume measurement device 56 may not be present. For example, an operator can be stationed at the device 30 to manually, e.g., visually, count the number of drops discharged from the drop discharge device 48. The container 54 can be a graduated container and/or can include indicia, such as a line or mark, indicative of the selected volume. Thus, the operator can add cleaning liquid to the drop discharge device 48 and start the drop discharge device 48, e.g., can open the stopcock on the burette, and can count the drops discharged and visually determine when the selected volume is reached by noting when the volume of liquid in the container reaches the mark.

Another evaluation device 30' is shown in FIG. 3 and operation of this device 30' will now be described. Evaluation device 30' functions in similar manner as described above for evaluation device 30 but, rather than being a drops per volume device (as is device 30), evaluation device 30' is a drops per weight device. The initial evaluation of the cleaning liquid can be conducted in similar manner as described above but the baseline drop number, the critical point, and the control value can all be defined based on the number of drops to achieve a selected weight of the cleaning liquid rather than a selected volume. In operation, cleaning liquid can be added to the drop discharge device 48 either manually by an operator or, if the device 48 is connected directly to a source of cleaning liquid to be evaluated (e.g., tank 38 as illustrated in FIG. 3), by opening the valve 60. The drop device 48 can be started and drops from the drop device 48 directed into the container 54 on the weight measurement device 160. In one embodiment, an operator can visually count the number of drops discharged into the container 54 and can monitor the resultant weight of the accumulated cleaning liquid in the container 54 by monitoring the display 62 to ascertain the number of drops of the cleaning liquid to achieve the predetermined weight. In another embodiment, the number of drops can be counted by the optional drop-counting device 50. In a still further embodiment, the scale 160 can be operationally connected to the control device 52 such that when the drop number (i.e., the number of drops of cleaning liquid to provide the selected weight) approaches the control value, action similar to that described above can be taken to replace or treat the cleaning liquid.

While the above discussion focused on the evaluation of the cleaning liquid at the immersion cleaning station 36, the evaluation device 30 or 30' and addition device 32 at the spray cleaning station 18 could be operated in similar manner.

Thus, the present invention provides methods and devices that can be easily and economically incorporated into a conventional production process, such as but not limited to a conventional automotive production process. The methods and devices of the invention provide immediate, real time evaluation of the cleaning liquid cleaning performance that can be used to either replace the cleaning liquid or treat the cleaning liquid to restore its cleaning performance. The processes and devices of the invention eliminate the wasteful prior art system in which cleaning liquid is simply discarded after a set period of time without regard to whether the cleaning performance of the cleaning liquid was still acceptable.

The general concepts of the invention will be further described with reference to the following Example. However, it is to be understood that the following Example is merely illustrative of the general concepts of the invention and is not intended to be limiting.

EXAMPLE

This Example demonstrates the correlation between drop number, oil contamination, and cleaning ability of a selected cleaning liquid.

The correlation between drop number (in this Example being the number of drops to provide a selected volume of 10 ml), oil contamination, and cleaning efficiency was evaluated using two different types of substrates. The cleaning agent utilized was CK177N commercially available from PPG Industries, Inc. of Pittsburgh, Pa. The initial concentration of the cleaning agent to determine the baseline drop number for the cleaning liquid was 0.75 ounces of the cleaning agent per gallon of water to form the cleaning liquid. This corresponds to 0.53 wt. % of the cleaning agent in the cleaning liquid. The cleaning ability of the cleaning liquid was initially evaluated on both cold rolled steel (CRS) substrates and electrogalvanized (EG) substrates (commercially available from ACT Laboratories, Inc. of Hillsdale, Mich.) utilizing the conventional water break free test. The two types of substrates were initially cleaned with the cleaning liquid and both substrates demonstrated 100% water break free. The baseline drop number for the cleaning liquid was determined by adding the cleaning liquid to a burette and adjusting the burette stopcock to discharge drops of the cleaning liquid into a 10 ml volumetric flask. The number of drops of cleaning liquid discharged from the burette to provide 10 ml of cleaning liquid in the flask was counted manually and the baseline drop number for this particular cleaning liquid was found to be 389.

Next, small amounts of 61AUS oil commercially available from Quaker Oil Company was incrementally added to the cleaning liquid and the drop number to provide 10 ml again determined. FIG. 3 and Table 1 below illustrate the effect of the addition of the 61 AUS oil contaminant on the cleaning ability of the cleaning liquid. The percent water break free for both the cold rolled steel (CRS) and electrogalvanized (EG) substrates is reported as a two-number result with the first number being the percent water break of the front of the panel and the second number being the percent water break of the back of the panel. The notation "NM" means that the value was not measured.

TABLE 1

| Data Point | Drop # | Weight % CK177N | Weight % 61AUS | CRS % WBF | EG % WBF |
|---|---|---|---|---|---|
| 0 | 389 | 0.53 | 0 | 100/100 | 100/100 |
| 1 | 356 | 0.53 | 0.1 | 100/100 | 100/100 |
| 2 | 350 | 0.53 | 0.2 | 100/100 | 100/100 |
| 3 | 328 | 0.53 | 0.3 | 95/100 | 100/100 |
| 4 | 328 | 0.53 | 0.4 | 98/100 | 100/95 |
| 5 | 321 | 0.53 | 0.5 | 100/100 | 100/100 |
| 6 | 314 | 0.53 | 0.6 | 95/100 | 95/100 |
| 7 | 314 | 0.53 | 0.7 | 70/40 | 97/100 |
| 8 | 303 | 0.53 | 0.8 | 25/20 | 100/100 |
| 9 | 282 | 0.53 | 0.9 | 0/50 | 95/90 |
| 10 | 283 | 0.53 | 1 | NM | 100/65 |
| 11 | 291 | 0.53 | 1.1 | NM | 90/66 |
| 12 | 283 | 0.53 | 1.2 | NM | 70/40 |
| 13 | 283 | 0.53 | 1.3 | NM | 70/50 |
| 14 | 282 | 0.53 | 1.4 | NM | 80/70 |
| 15 | 281 | 0.53 | 1.5 | NM | 80/50 |
| 16 | 290 | 0.58 | 1.5 | 0/0 | 90/25 |
| 17 | 297 | 0.64 | 1.5 | 0/0 | 90/20 |
| 18 | 313 | 0.69 | 1.5 | 15/30 | 90/33 |
| 19 | 318 | 0.74 | 1.5 | 75/100 | NM |
| 20 | 331 | 0.8 | 1.5 | 100/100 | NM |

As shown in FIG. 3 and Table 1, as the weight percent of oil contaminant increases, the cleaning ability of the cleaning liquid (as demonstrated by the water break free results) and the drop number of the cleaning liquid (the number of drops to provide the selected volume of 10 ml) decreased. However, from about data point 10 to data point 15, the drop number is relatively constant.

Next, as shown in Table 1 for data points 16–20, additional amounts of the cleaning agent CK177N were added to the contaminated cleaning liquid to restore the cleaning liquid to acceptable cleaning levels. As shown in Table 1, 0.8 wt. % of CK177N restored the cleaning liquid to acceptable levels (100/100 percent water break free). It should be noted that the cleaning liquid began to display unacceptable cleaning properties for automotive applications (i.e., water break free less than 100%) at about data point 3 corresponding to a drop number of 328. After contamination of the cleaning liquid with oil and subsequent refreshing of the cleaning liquid with additional cleaning agent, the drop number at data point 20 (indicating the return to acceptable cleaning properties) was 331. Thus, for this particular system, the critical point would appear to be in the range of about 328 to 331. The control number for this system should be set above the critical point, for example, at about 350. As will be appreciated, the amount of cleaning agent added to achieve acceptable cleaning performance need not be that to restore the cleaning liquid to the baseline drop number, but can be that to maintain the cleaning liquid above the critical point.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A method of evaluating the cleaning performance of a cleaning liquid, comprising:

determining a control value for a cleaning liquid;

contacting the cleaning liquid with a substrate to be cleaned;

measuring a drop number of the cleaning liquid after contact with the substrate; and comparing the measured drop number to the control value.

2. The method of claim 1, including adding at least one cleaning agent to the cleaning liquid when the measured drop number reaches the control value.

3. The method of claim 1, including determining a baseline drop number for the cleaning liquid.

4. The method of claim 3, including adding cleaning agent to the cleaning liquid until the measured drop number is substantially equal to the baseline drop number.

5. The method of claim 2, including:

defining a critical point for the cleaning liquid; and adding sufficient cleaning agent to maintain the measured drop number above the critical point.

6. The method of claim 1, wherein the cleaning liquid is in a cleaning bath of an automotive production process.

7. The method of claim 2, wherein the adding step is practiced by:

a) adding a predetermined amount of the at least one cleaning agent to the cleaning liquid;

b) measuring the drop number of the cleaning liquid after addition of the cleaning agent; and c) continuing steps a) and b) until the measured drop number is substantially equal to a baseline drop number.

8. The method of claim 1, wherein the control value is determined by:

a) providing a cleaning liquid sample having acceptable cleaning properties;

b) adding a contaminant to the cleaning liquid sample until the cleaning properties become unacceptable;

c) measuring the drop number of the cleaning liquid when the cleaning properties become unacceptable;

d) defining the measured drop number from step c) as a critical point; and e) defining a drop number above the critical point as the control value.

9. The method of claim 1, wherein the cleaning liquid is an aqueous liquid.

10. The method of claim 2, wherein the adding step includes:

positioning an addition device adjacent the cleaning liquid; and connecting the addition device to a control device, wherein the control device is configured to automatically activate the addition device when the measured drop number reaches the control value.

* * * * *